April 27, 1965 C. A. MORCHAND 3,180,931

INFORMATION PRESENTATION SYSTEM BY OPTICALLY MULTIPLEXING A PLURALITY OF VISUAL SCENES AND GENERATION OF A COMPOSITE VIDEO SIGNAL THEREFROM

Filed April 17, 1961 3 Sheets-Sheet 1

INVENTOR.
Charles A. Morchand

INVENTOR
Charles A. Morchand

*INVENTOR.*
Charles A. Morchand 3,180,931

INFORMATION PRESENTATION SYSTEM BY OPTICALLY MULTIPLEXING A PLURALITY OF VISUAL SCENES AND GENERATION OF A COMPOSITE VIDEO SIGNAL THEREFROM

Charles A. Morchand, 288 Lexington Ave., New York, N.Y.

Filed Apr. 17, 1961, Ser. No. 103,565
19 Claims. (Cl. 178—6.8)

This invention relates to visual information transfer systems and more particularly to improvement in my co-pending application Serial No. 760,446 for an Action-Reaction Television System.

Although the co-pending application describes a system which admirably performs the roles of an educational and amusement device, it is a general object of the present invention to provide improvements in such a system.

It is another general object of the invention to provide an improved system of the class described which is more versatile.

It is another object of the invention to provide a system of the class described which is capable of transmitting a plurality of different classes of information over a single channel and to permit the viewer to select, under the control of the transmitting station, the class of information which he desires to view.

It is another object of the invention to permit the viewer to select not only one of the classes of the information being received or being transmitted from a given channel but to be able to select from the classes of information being transmitted over other channels, under the control of signals from the channel that is being presently viewed.

Briefly, the invention contemplates a television system comprising means for generating a plurality of pictures. Means are provided for combining the plurality of pictures into a composite picture wherein each of the pictures of the plurality occupies a predetermined portion of the composite picture. Receiving means receive the composite picture and a viewer has means available in the receiving means for selecting a desired portion of the composite picture. The receiving means also includes means for displaying only the selected portion of the composite picture.

Other objects, features and advantages of the invention will be evident from the following detailed description when read in connection with the accompanying drawings wherein.

Figure 1:
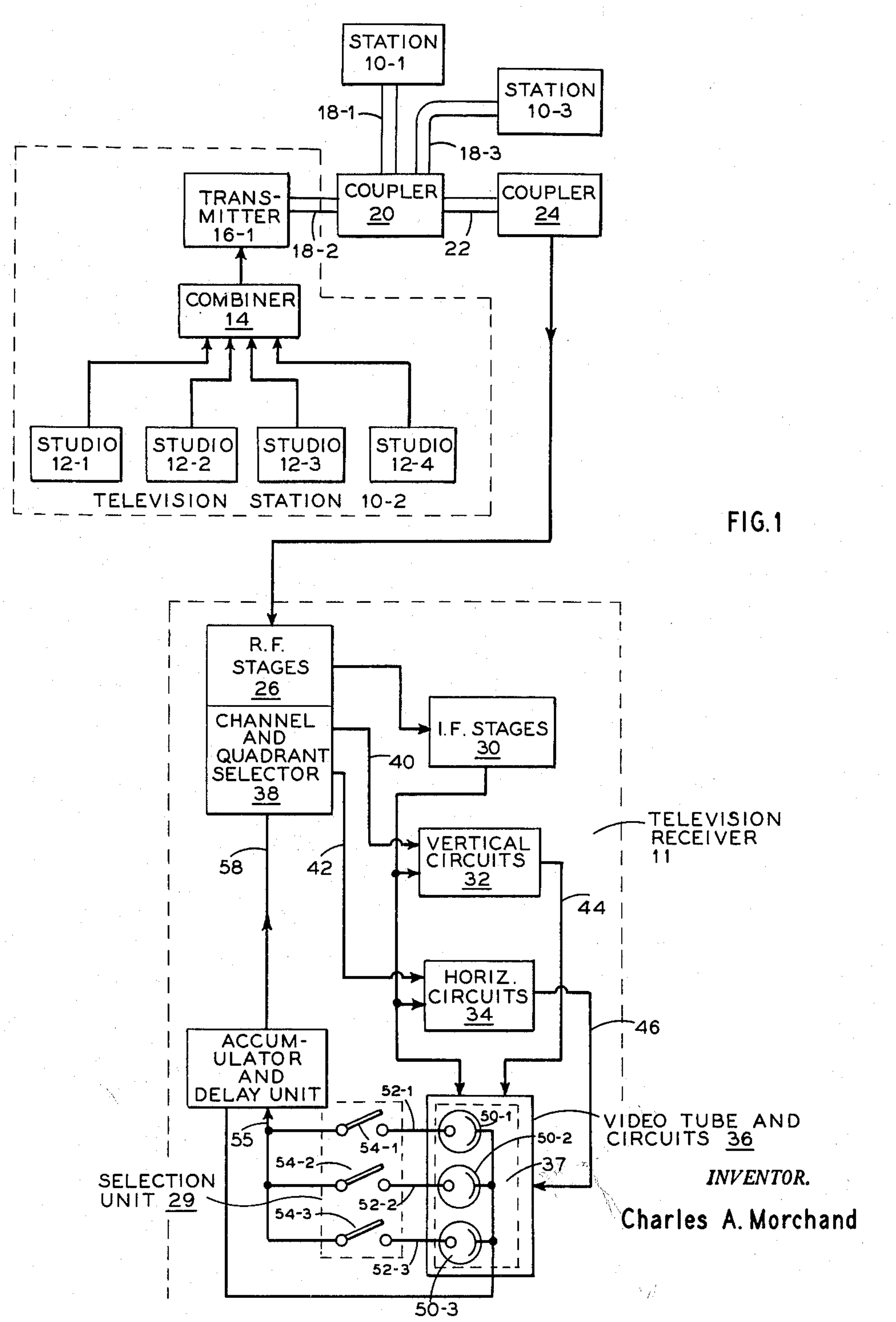
FIG. 1 is an educational or amusement television system in accordance with a preferred embodiment of the invention.

Referring to FIG. 1, an information transfer system is shown comprising a plurality of television stations 10 simultaneously transmitting signals via associated co-axial cables 18 to coupler 20 which then feeds the signals via co-axial cable 22 to coupler 24 which is connected to television receiver 11. Generally, co-axial cable 22 will be connected to a plurality of television receivers similar to television receiver 11. It should be noted that although the information transfer system shows connections between the television stations 10 and the television receiver 11 as a co-axial cable link, the system is equally suited for over-the-air transmission whereby the television stations are provided with transmitting antennas and the television receiver 11 is provided with a receiving antenna.

Each television station 10 of which station 10–2 is typical includes four studios 12–1 to 12–4, a combiner 14 and a transmitter 16. These units will hereinafter be more fully described. However, for the present it is only necessary to know that each of the studios 12 is simultaneously generating a different video picture. Superimposed on this picture are control signals in the form of controllably occurring spots of light in a predetermined area of the picture. Each of the studios transmits its picture to combiner 14. Combiner 14 accepts the four pictures simultaneously and positions each picture in a different quadrant of a frame to form a new composite picture which is a simultaneous transmission of the four pictures received. For example, the upper left hand quadrant of a frame may contain the picture being transmitted from studio 12–1; the upper right hand quadrant of the frame would have the picture being transmitted by studio 12–2; the lower left hand quadrant of the frame would carry the picture being generated by studio 12–3 while the lower right hand quadrant of the frame would contain the picture being transmitted by studio 12–4. The so-described composite picture is then transmitted from combiner 14 via transmitter 16 to co-axial cable 18–2 into the transmission system comprising coupler 20 and co-axial cable 22. The composite picture is received by television receiver 11 which is a conventional television receiver with several hereinafter described modifications.

It should be noted that the sound portion may be transmitted over separate lines that may be connected to the television receiver. The signals representing the composite picture are received by RF stages 26 and transmitted via conventional IF stages 30 to the conventional vertical circuits 32, the horizontal circuits 34 and the video circuits 36. Vertical circuits 32 and horizontal circuits 34 are conventional circuits with one exception. There must be provision to control the bias on the vertical and horizontal amplifiers, as is hereinafter more fully described.

The choice of the quadrant of the picture and of the channel to be received is controlled by channel and quadrant selector 38. Channel and quadrant selector 38 is generally a conventional television tuner for receiving VHF television signals. Such a tuner is provided for the reception of channels 2 to 13. If, by way of example, there are only three channels in the system, it is possible to assign four positions of the tuner to each channel. Each of the four adjacent positions is tuned to the same channel. For example, in the system under description, channel 1 would have assigned to it tuner positions 2, 3, 4 and 5; channel 2, positions 6, 7, 8 and 9 and channel 3, positions 10, 11, 12 and 13. Such a modification is within the ability of a man skilled in the art for it only requires the changing of the values of the associated tuning capacitors in the tuner.

The second modification of the tuner includes the addition of a two-deck switch which is ganged to the tuner shaft. Each deck of the switch has a number of positions commensurate with the number of positions on the tuner. Therefore, four positions of each deck of the switch will be associated with the four positions of the tuner. In particular, if the positions 2 to 5 of the tuner are associated with channel 1, the positions 2 to 5 of one deck of the switch are also associated with channel 1 and four similar positions on the second deck of the switch are also associated with channel 1. The positions on the two decks of the switches are so wired to sources of voltage so that voltages are sent to the vertical circuits 32 via line 40 and voltages are sent via line 42 to the horizontal circuits 34. The voltages on lines 40 and 42 control the biases respectively of the vertical and horizontal amplifiers so as to position only one of the quadrants of the received picture on the display tube 37 of video circuits 36. It will immediately be apparent that since four positions are assigned to each channel, it is possible to generate four combinations of voltages on lines 40 and 42 to control the deflection circuits so that the picture on display tube 37 is only one of the four quadrants of the received picture. It should of course be noted that if a conventional size display tube is being employed, it will be necessary to increase the gain of the video amplifiers in video circuits 36 so that the quadrant being displayed occupies the major portion of the display tube 37.

To summarize, when the television receiver 11 is receiving signals from channel 1, the channel and quadrant selector 38 will be on one of the first four positions. In particular, if it is on the position generally associated with conventional channel 2, the upper left hand quadrant of the received picture will be displayed by the display tube 37. If it is on the position generally associated with conventional channel 3, the upper right hand quadrant of the picture being received will be displayed on the display tube 37, etc. It has thus been shown how it is possible to transmit four distinct pictures over one conventional channel as a composite picture and to select one of the four distinct pictures by selecting a quadrant of the received composite picture and only displaying that particular quadrant by virtue of controlling the biases of the vertical and horizontal amplifiers in the horizontal and vertical circuits.

During the transmission of an audience participation program such as an educational television program, the video signals are slightly modified. It should be noted that for the sake of simplicity the system as described shows a live program. In a practical system the entire program would be pre-recorded. In particular, at times say selected by the instructor, a plurality of spots of light are introduced along one edge of the picture presented to the video circuits 36. These spots of light appear at predetermined areas of the display tube 37. A plurality of photocells 50 are disposed respectively above each of these areas. Each of the photocells 50 is shaded so that it can only receive light from the immediate area below it on the display tube 37. If one of the photocells 50 detects a spot of light on the display tube 37, it transmits a signal via the associated line 52 to an associated switch 54 in selection unit 29. Switches 54 which are spring biased to their open position are operated by the viewer. Signals passed by switches 54 are transmitted via line 55 to the accumulator and delay unit 56, which is hereinafter more fully described.

Generally, each of the photocells 50 will detect a series of spots of light, the last of which is appreciably longer than the preceding ones. For example, at any one time control signals in the forms of spots of light may appear under photocell 50–1. By way of illustration there may be three spots of light of short duration followed by a spot of light of long time duration while at the same time photocell 50–2 may sense only one short duration spot of light followed by a spot of light of long time duration and the photocell 50–3 may sense say five short spots followed by one of long time duration. The photocells 50 convert these periodic occurring spots of light to voltage pulses. Just prior to the occurrence of these spots of light the instructor may inform the viewer that if he wishes to change to another picture he should close certain of the switches 54. It will be noted that each of the switches 54 then will transmit a number of voltage pulses equal to the number of spots of light occurring below its associated photocell 50. The voltage pulses transmitted by the closed switch 54 are accumulated in the accumulator and delay unit 56 which will not operate until a voltage pulse of long time duration occurs. At that time, the number of voltage pulses received are then transmitted via line 58 to the channel and quadrant selector 38. Channel and quadrant selector 38 includes a rotary solenoid of the pulsing type; that is, each time it receives a voltage pulse it steps a particular angular displacement. In other words, each voltage pulse received via line 58 causes the channel and quadrant selector 38 to rotate one conventional channel position.

In summary, if during the transmission of an educational program for example, spots of light momentarily appear at predetermined areas of display tube 37 and the viewer has been directed to operate particular ones of the switches 54 in the selection unit 29, it is possible to cause the television receiver 11 to switch to the reception of signals from other quadrants or other channels.

Such a system can be used in many ways. For example, consider the type of program when an instructor is giving a course in one of the social sciences; in such a case the selection unit 29 would be basically a control box with a plurality of hand operated switches in easy access to the viewer and a plurality of stations 10 would be under the control of the instructor. At the start of the program, the viewer would operate the channel and quadrant selector 38 to the appropricate channel to start viewing the lecture. Sometime during the course of the presentation a critical point is arrived at and the instructor would direct his audience to depress, for example, switch 54–1 in selection unit 29 if they wish the point repeated or to depress switch 54–2 if they want the point to be further expanded. The instructor then flashes one spot of light of greater time duration in the region under photocell 50–1 and two sequential spots of light, the second of greater time duration, under the region of photocell 50–2. If switch 54–1 is depressed, the accumulator and delay unit 56 will receive one pulse. If, however, the switch 54–2 is depressed the accumulator and delay unit 56 will receive two pulses. In either event, the accumulator and delay unit 56 will then transmit the received pulses via line 58 to either rotate the channel and quadrant selector 38 one or two positions so that a different picture will be received. During this time the different studios of the stations 10 will be showing different pictures. At the end of the explanations given by these studios the viewer then is directed to close one of the appropriate switches 52 and a sufficient number of flashes of light are generated at the appropriate station to cause the channel and quadrant selector 38 to return to the home station where the main portion of the instruction is again picked up.

Figure 2:
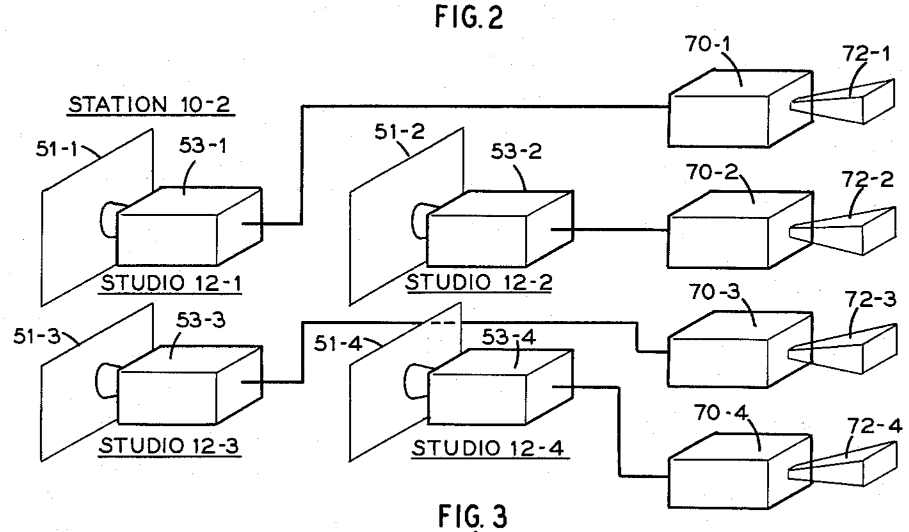
FIG. 2 shows the studio and a portion of the combiner of a television station.

Several elements of the system will now be described in detail. Referring to FIG. 2, a portion of a typical station 10–2 is shown comprising four studios 12–1 to 12–4. A typical studio 12–1 comprises a television camera 53 directed at a background 51 before which an instructor would be standing. Each of the television cameras 53 is connected to an associated receiver 70–1 which displays the picture being scanned on display tube 72.

Figure 3:
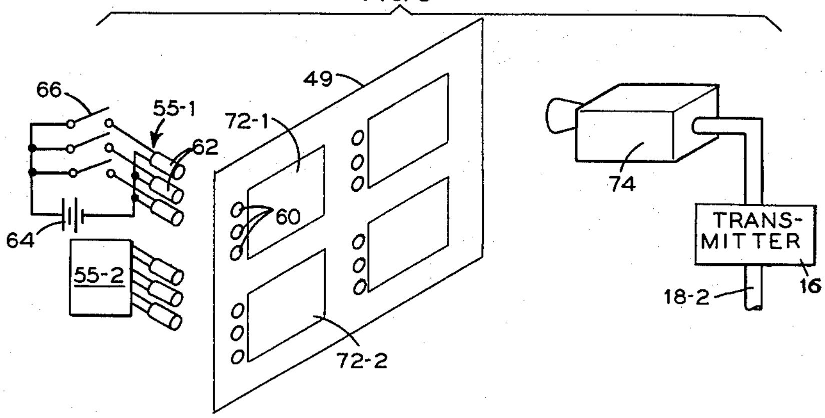
FIG. 3 shows a portion of the combiner and the transmitter of a television station.

In FIG. 3, the remainder of station 10–2 is shown. The display tubes 72 from each of the studios 12 is fixed in a combiner 14 to form a composite four quadrant picture. Combiner 14 includes a frame 49 which holds the display tubes 72. Associated with frame 49 along the edge of each display tube 72 is a light spot generator 55. Light spot generator 55 comprises a plurality of apertures 60, in frame 49, behind which are light sources 62 which may be shaded. One terminal of the light source is connected to a voltage source 64, the other terminal of each light source 62 is connected to the fixed contact of an associated switch 66. Thus each time the switch 66 is closed, the associated light source 62 is lit. When none of the light sources 62 are lit, the picture on display tube 72 has a uniformly dark border which adds nothing to the picture to be transmitted. However, when one of the light sources 62 is lit, signals representing the spot are effectively superimposed or introduced into the video signal representing the image being viewed by camera 74. The combiner 14 simultaneously displays the four pictures being received by the receivers 70–1 to 70–4 and their associated light spots. Television camera 74 converts these pictures and light spots to a video signal which is transmitted via transmitter 16 to the co-axial line 18–2. Although in the embodiment shown the four pictures are combined purely by their physical juxtaposition, it should be apparent to those skilled in the art that it is possible by conventional electronic techniques to superimpose the four pictures so that they appear at different corners of a quadrant.

Figure 4:
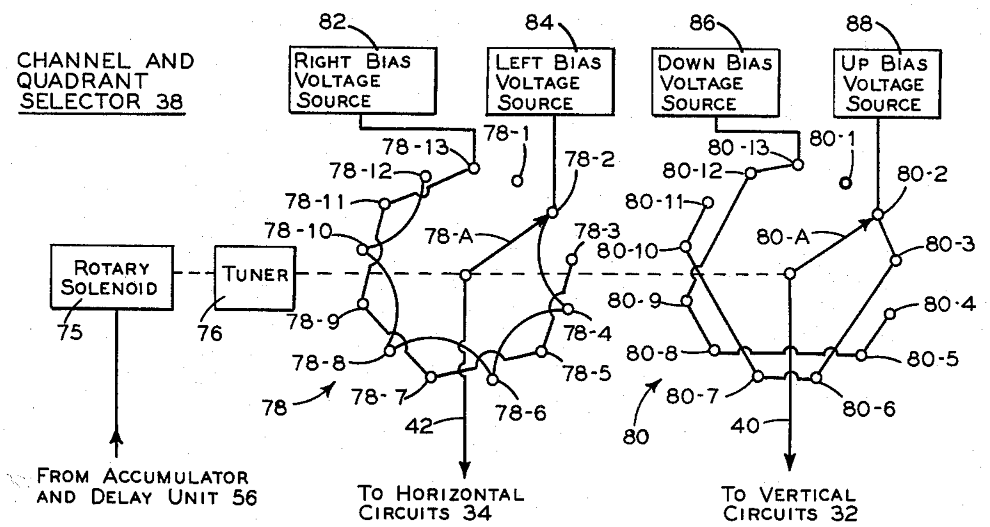
FIG. 4 shows one embodiment of the channel and quadrant selector of a television receiver in accordance with the invention.

FIGURE 4 shows one embodiment of the channel and quadrant selector 38 comprising a conventional tuner 76 ganged to the rotary switch 78 and the rotary switch 80 which are driven by a conventional rotary solenoid 75 of the pulsing type. Rotary switches 78 and 80 include a number of fixed contacts equal to the number of channel contacts in the conventional tuner 76. Switch 78 has its fixed contacts 78–2, 78–4, 78–6, 78–8, 78–10 and 78–12 connected to a left bias voltage source 84. Similarly, fixed contacts 78–3, 78–5, 78–7, 78–9, 78–11 and 78–13 are connected to a right bias voltage source and the moving contact 78–A is connected via line 42 to the horizontal circuits 34. Thus, when the quadrant and channel selector 38 is on conventional channel 2, a left bias voltage is transmitted to the horizontal circuits 34, causing the picture to shift to the left half of the display tube 37. Switch 80 has its fixed contacts 80–2, 80–3, 80–6, 80–7, 80–10, and 80–11 connected to an up bias voltage source 88 and its fixed contacts 80–4, 80–5, 80–8, 80–9, 80–12 and 80–13 connected to a down bias voltage source 86. Thus, if the quadrant and channel selector 38 is say in the position of conventional channel 2, an up bias voltage will be transmitted via moving contact 80–A and line 40 to the vertical circuits 32. Therefore, when the conventional tuner is set to conventional channel 2, the upper left hand quadrant of the composite picture will be presented to a viewer. It should be noted that it may be necessary when viewing the pictures to insure that the typical video amplifiers have increased gain so that the quadrant being displayed covers substantially the entire portion of the display tube.

It should be further noted that it may be more desirable to place a frame over display tube 37 which also supports photoelectric cells 50. The frame would mask the display tube 37 down to a size where only the proper portions of the picture are displayed.

Figure 5:
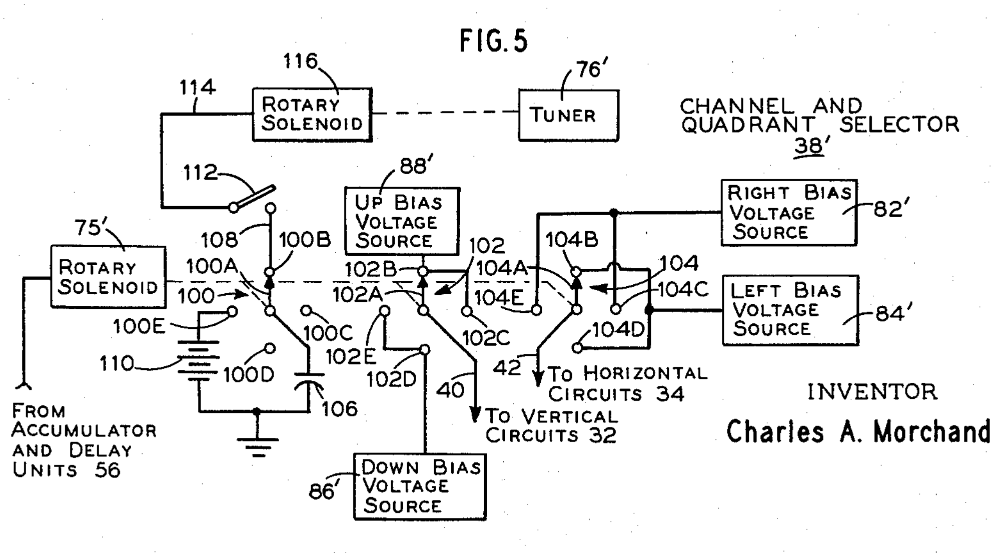
FIG. 5 shows an alternate embodiment of the channel and quadrant selector.

FIGURE 5 shows an alternate embodiment of the channel and quadrant selector 38' which permits the reception of more channels by television receiver 11. Since many elements are similar to elements of channel and quadrant selector 38, primed reference characters will be employed to show the similarities. Rotary solenoid 75' drives ganged switches 100, 102 and 104. It should be noted that rotary solenoid 75' and ganged switches 100, 102 and 104 may be a single unit which is available under the trade name Ledex. Each of the switches 100, 102 and 104 of which 100 is typical has a moving contact 100–A, and fixed contacts 100–B, 100–C, 100–D, and 100–E.

Switch 102 is concerned with the vertical selection of a quadrant just as switch 80 of FIG. 4. Switch 104 is concerned with the horizontal selection of a quadrant, just as switch 78 of FIG. 4. Switch 100, however, is concerned with channel selection. Moving contact 100–A is connected to capacitor 106. Fixed contact 100–B is connected to line 108. Fixed contact 100–E is connected to source of voltage 110. During operation, as rotary solenoid 75' receives electrical pulses from accumulator and delay unit 56, the moving contacts 100–A, 102–A and 104–A step clockwise. When the moving contacts 100–A, 102–A and 104–A are in contact respectively with fixed contact 100–C, 102–C and 104–C voltages are sent via lines 40 and 42 to the vertical and horizontal circuits respectively to cause the display of the upper right quadrant. When the moving contacts 100–A, 102–A and 104–A are in contact respectively with fixed contacts 100–D, 102–D, 104–D, the voltages transmitted cause the display of the lower left quadrant. When the moving contacts 100–A, 102–A and 104–A are in contact with fixed contacts 100–E, 102–E and 104–E, the lower right hand quadrant is being displayed. Since moving contact 100–A is in contact with fixed contact 100–E, capacitor 106 is charged from source of voltage 110. When the moving contacts 100–A, 102–A and 104–A now move to their fixed contacts 100–B, 102–B and 104–B, an upper left quadrant can be displayed. At the same time, an electrical pulse is transmitted on line 108. If switch 112 is open the upper left quadrant of the same channel is displayed. If switch 112 is closed the upper left quadrant of a new channel is displayed. Line 114 connects switch 112 to rotary solenoid 116 which is mechanically coupled to tuner 76'. Each pulse received by rotary solenoid 116 positions tuner 76' to the next adjacent channel.

It should be noted that switch 112 permits a viewer to either restrict picture viewing to the four quadrants of a single channel or to a plurality of channels.

Figure 6:
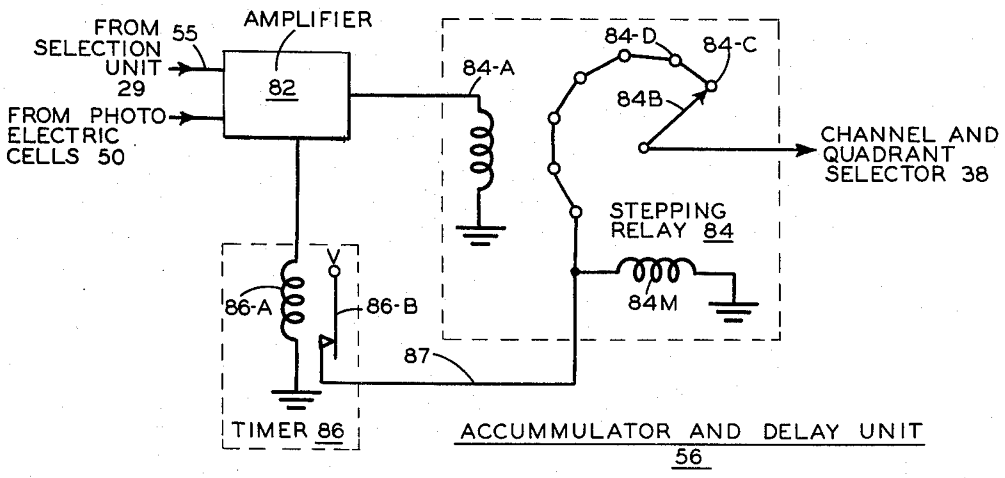
FIG. 6 shows the accumulator and the delay unit of the television receiver in accordance with the invention.

Accumulator and delay unit 56 is shown in FIG. 6 comprising a conventional signal amplifier 82, a stepping relay 84 and a timer 86. As electrical pulses are received from selection unit 29, they pulse the coil 84–A of stepping relay 84. Each pulse of the coil steps the moving contact 84–B to a different fixed contact 84–C, 84–D, etc. of stepping relay 84. It will be recalled that the electrical pulses received are of a given time duration, with the last electrical pulse being of greater time duration. As the electrical pulses are received, they are also fed by amplifier 82 to timer 86 which may be a special magnetic relay with slow operate feature and each pulse passes current through the coil 86–A of timer 86. However, the short duration pulses do not last long enough to cause the contacts 86–B to operate. However, the last pulse in the series is of sufficient duration to cause the contacts 86–B to operate. When these contacts close a voltage V is applied to line 87 which energizes reset coil 84–M of stepping relay 84 and applies the voltage V to each of the fixed contacts 84–C, etc. The energizing of reset coil 84–M causes moving contact 84–B to return to its home position. While returning to its home position, moving contact 84–B passes over each of the fixed contacts 84–D, etc. which is also receiving a voltage V, causing stepping pulses to be sent to the channel and quadrant selector 38. The stepping relay 84 can also take many forms which are well known in the art, a typical form being a Guardian Stepper in the series MER. However, it should be noted if such a stepper is used it is necessary to slow down the rate of rotation during reset. This can be done by decreasing the spring tension in the stepping mechanism or by applying a magnetic brake to the shaft.

There has thus been shown an improved television system which can be used for audience participation. The system, by using different quadrants of a picture, enhances the versatility of such a presentation and, by using a delay and accumulator for accumulating pulses, permits more versatile programming.

It will now be obvious to those skilled in the art many modifications and variations which accomplish the objects of the invention and realize many or all of its advantages but which do not depart from the spirit of the invention as defined in the claims which follow.

What is claimed is:

1. A television system comprising means for generating signals representing a plurality of pictures, means for combining said signals representing the plurality of pictures into signals representing a composite picture wherein the signals representing each of said plurality of pictures occupies a predetermined portion of the signals representing said composite picture, said composite picture being in a single television frame, means for transmitting the signals representing said composite picture, means for receiving the signals representing said composite picture, means for selecting a desired one of said portions of the signals representing said composite picture, and means for displaying as a complete frame only the selected portion of said composite picture.

2. A television system comprising: a plurality of video signal transmitters, each of said video signal transmitters including a plurality of means for converting optical information to electrical information signals each representing a television frame and means for combining the electrical information signals to a composite electrical information signal in a single television frame; means for receiving the plurality of composite electrical information signals, and means included with said receiving means for selecting at any time only one of the portions of one of the composite electrical information signals and means for displaying the selected portion of the selected composite electrical information signal as visual stimuli representing a complete television frame.

3. A television system comprising: a television transmitter for transmitting signals related to visual information, said television transmitter including means for converting a plurality of scenes to a plurality of information signals each representing a scene, means for incorporating into said information signals control signals representing a plurality of light indicia, means for combining into a composite signal the representation of a composite picture wherein each scene occupies a predetermined portion of the composite picture with its associated light indicia; a television receiver for receiving the composite signal from said television transmitter, said television receiver having a channel selector with a plurality of positions, each of said positions being related to a different predetermined portion of the composite picture represented by the composite signal, a video system, a vertical control system, a horizontal control system, and a display tube, means connected to said channel selector for generating positioning voltages, means for connecting the channel selector to the horizontal and vertical control systems whereby the portion of the composite picture displayed is controlled by the position of the channel selector, said video system converting the information signals to visible stimuli and the control signals related to said plurality of light indicia to predetermined areas of light on said display tube; a plurality of switches adapted to be operated for choosing for display a portion of the composite picture represented by the composite signal; a plurality of photoelectric devices in series circuit relation with respectively each of said switches, means connected to said switches for receiving electrical pulses when one of said switches is closed and the associated serially connected photoelectric device detects light areas for repositioning said channel selector.

4. A television system comprising: a television transmitter for transmitting signals related to visual information, said television transmitter including means for converting a plurality of scenes to a plurality of information signals each representing a scene, means for incorporating into said information signals control signals representing a plurality of pulsed light indicia, means for combining into a composite signal the representation of a composite picture wherein each scene occupies a predetermined portion of the composite picture with its associated pulsed light indicia; a television receiver for receiving the composite signal from said television transmitter, said television receiver having a channel selector with a plurality of positions, each of said positions being related to a different predetermined portion of the composite picture represented by the composite signal, a video system, a vertical control system, a horizontal control system, and a display tube, means connected to said channel selector for generating positioning voltages, means for connecting the channel selector to the horizontal and vertical control systems whereby the portion of the composite picture displayed is controlled by the position of the channel selector, said video system converting the information signals to visible stimuli, and the control signals related to said plurality of pulsed light indicia to predetermined areas of light on said display tube; a plurality of switches adapted to be operated for choosing for reception by said television receiver a portion of the composite picture represented by the composite signal; a plurality of photoelectric devices in series circuit relation with respectively each of said switches, means connected to said switches for accumulating a series of electrical pulses when one of said switches is closed and the associated serially connected photoelectric device detects a series of light pulses and to transmit an equal series of electrical pulses after the last light pulse is received, and means connected to said accumulating means for repositioning said channel selector in accordance with the number of electrical pulses received.

5. A television system comprising: a plurality of television transmitters for transmitting signals related to visual information over a plurality of channels, each of said television transmitters including means for converting a plurality of scenes to a plurality of information signals each representing a scene, means for incorporating into said information signals control signals representing a plurality of light indicia, means for combining into a composite signal the representation of a composite picture wherein each scene occupies a predetermined portion of the composite picture with its associated light indicia; a television receiver for receiving the composite signal from one of said television transmitters, said television receiver having a channel selector with a plurality of positions assigned to each channel, each of said positions being related to a different predetermined portion of the composite picture represented by the composite signal, a video system, a vertical control system, a horizontal control system, and a display tube, means connected to said channel selector for generating positioning control voltages, means for connecting the channel selector to the horizontal and vertical control systems whereby the portion of the composite picture displayed is controlled by the position of the channel selector, said video system converting the information signals to visible stimuli and the control signals to predetermined areas of light on said display tube; a plurality of switches adapted to be operated for choosing for reception by said television receiver the composite signal from one of said transmitters and for displaying a chosen portion of the composite picture represented by the chosen composite signal; a plurality of photoelectric devices in series circuit relation with respectively each of said switches, means connected to said switches for receiving electrical pulses when one of said switches is closed and the associated serially connected photoelectric device detects an area of light on the appropriate area of said display tube for repositioning said channel selector in accordance with the electrical pulses received.

6. A television system comprising: a plurality of television transmitters for transmitting signals related to visual information over a plurality of channels, each of said television transmitters including means for converting a plurality of scenes to a plurality of information signals each representing a scene, means for incorporating into said information signals control signals representing a plurality of pulsed light indicia, means for combining into a composite signal the representation of a composite picture wherein each scene occupies a predetermined portion of the composite picture with its associated plurality of pulsed light indicia; a television receiver for receiving the composite signal from one of said television transmitters, said television receiver having at least a channel selector with a plurality of positions assigned to each channel, each of said positions being related to a different predetermined portion of the composite picture represented by the composite signal, a video system, a vertical control system, a horizontal control system, and a display tube, means connected to said channel selector for generating positioning control voltages, means for connecting the channel selector to the horizontal and vertical control systems to receive the positioning control voltages whereby the portion of the composite picture displayed is controlled by the position of the channel selector, said video system converting the information signals to visible stimuli, and the control signals to predetermined areas of pulsating light on said display tube; a plurality of switches adapted to be operated for choosing for reception by said television receiver the composite signal from one of said transmitters and for displaying a chosen portion of the composite picture represented by the chosen composite signal; a plurality of photoelectric devices in series circuit relation with respectively each of said switches, means connected to said switches for accumulating a series of electrical pulses when one of said switches is closed and the associated serially connected photoelectric device detects a series of light pulses and to transmit an equal series of electrical pulses after the last pulse is received, and means connected to said accumulating means for repositioning said channel selector in accordance with the number of electrical pulses received.

7. A system comprising a plurality of means for converting optical information to electrical information signals, each of said means converting different optical information to different electrical information signals, means associated with said converting means for generating at given times control signals associated with said different electrical information signals, means for combining said electrical information signals into a composite means for transmitting said control signals and said composite electrical information signals, means for receiving said control signals and said composite electrical information signals, changing means adapted to be operated by a subject for selecting a different portion of said composite electrical information signal under response of said received control signals, said different portion being selected only after said changing means has been operated and a control signal is received, and means for converting said different portion of the composite electrical information signal to a visual stimuli.

8. The system of claim 7 wherein said changing means includes first means operatable by the subject to enable the change and second means responsive to the control signals and said first means to effect the change.

9. The system of claim 8 wherein said control signals determine which portion of the composite electrical information signal is to be selected.

10. The system of claim 8 wherein said control signals determine the time when the change occurs.

11. A television system for displaying pictures comprising means for generating information signals representing a plurality of pictures, means cooperating with said information signal generating means for generating a plurality of control signals associated with said plurality of pictures, means for combining said information signals into signals representing a composite picture wherein the signals representing each of said plurality of pictures occupies a predetermined portion of the signals representing said composite picture, means for transmitting said control signals and said composite picture signals, means for receiving said control signals and said composite picture signals, changing means adapted to be operated by a subject for selecting different portions of the composite picture signal under response of received control signals, said different portion being selected only after said changing means has been operated and a control signal has been received, and means for displaying only the picture represented by the selected portion of said composite picture signal.

12. The system of claim 11 wherein said changing means includes first means operatable by the subject to enable the change and second means responsive to the control signal and said first means to effect the change.

13. The system of claim 12 wherein said control signals determine which portion of the composite picture signal is to be selected.

14. The system of claim 12 wherein said control signals determine the time when the change occurs.

15. An information transfer system comprising a plurality of sources of information signals, means for combining the information signals of each of said sources into a composite information signal, means cooperating with each of said sources for generating a plurality of control signals, each of which is related to at least one other of said sources, means for transmitting said control signals and said composite information signals, receiving means for receiving said control signals and said composite information signals, switching means associated with said receiving means for selecting different portions of said composite information signals, selection means adapted to be operated by a subject for initiating selection of one of said portions, control means for receiving said control signals, said switching means operating when said selection means has operated, and a control signal is received to permit selection of a different portion of the composite information signal.

16. The system of claim 15 wherein said control signals determine the time of switching.

17. The system of claim 15 wherein a received control signal permits switching to its associated portion of said composite information signal.

18. An information transfer system comprising a plurality of sources of information transmitted over a single channel, means for receiving the sources of information, means for identifying each of the sources and means for displaying to a viewer only one of the sources at a time, selection means connected to said receiving means, said selection means being adapted to be operated for initiating the selection of another of said sources, said receiving means connected to said selection means for presenting the selected source of information to a viewer, means cooperating with said sources for transmitting control signals at predetermined times, each of said control signals being related to at least one other of said sources, said control signals determining the moment of change to another source, control means for receiving said control signals, and switching means for switching said receiving means to receive information from another source only when said selection means has been operated to initiate the selection of said another source and at the time of an occurrence of a control signal which is related to said another source and which is received by said control means.

19. The system of claim 18 wherein said control signals only determine the time of change to a source selected by said selection means.

References Cited by the Examiner

UNITED STATES PATENTS

| | | | |
|---|---|---|---|
| 2,527,967 | 10/50 | Schrader | 178—6 |
| 2,568,166 | 9/51 | Perry | 178—6.8 |

DAVID G. REDINBAUGH, *Primary Examiner.*

E. JAMES SAX, *Examiner.*